United States Patent Office 2,800,683
Patented July 30, 1957

2,800,683
APPARATUS FOR MANUFACTURING REINFORCED MEMBERS

Hermann Teichmann, Wolfratshausen, Germany, assignor to Firma Krauss-Maffei Aktiengesellschaft, Munich-Allach, Germany Application November 23, 1954, Serial No. 470,737

Claims priority, application Germany November 24, 1953

12 Claims. (Cl. 18—13)

The present invention relates to an apparatus for manufacturing reinforced members, and more particularly to an apparatus for reinforcing extruded members simultaneously with the extrusion thereof.

For example, it is well known that plastic tubular members such as hoses and the like may be continuously extruded to any desired lengths, and devices have already been provided for reinforcing such members as by embedding helical wiring or the like in the same. The known devices for manufacturing such articles have several disadvantages, however. Thus, it is essential with the present state of the art to provide reinforcing members which must be helically wound before they are embedded into the material which forms the tubular member. As a result of this requirement, the present day structures for manufacturing such articles are exceedingly bulky, complicated, and expensive, and are not very reliable in operation, and, furthermore, because the helical reinforcing wire or the like must maintain its helical configuration while it is being embedded into the plastic composition, it is essential that such helical reinforcing members have a certain stiffness and rigidity, since otherwise they would not be capable of retaining their helical shape. Therefore, it is impossible to reinforce plastic tubular members with elongated helical wiring or the like which is not rigid enough to maintain its helical shape, and this is a distinct disadvantage since the ease with which the finished product may be bent as well as its weight are undesirably affected by the rigidity of the reinforcing members.

One of the objects of the present invention is to overcome the above drawbacks by providing an apparatus capable of embedding in a plastic composition a reinforcing member which need not be preformed to a given shape before it is embedded.

Another object of the present invention is to provide an apparatus capable of unwinding a reinforcing member from a spool or the like and directly embedding the reinforcing member in the article being manufactured during the manufacture thereof and in a fully continuous manner.

A further object of the present invention is to provide an apparatus capable of forming an elongated flexible reinforcing member into a helix simultaneously with the embedding of the reinforcing member in the plastic composition which is formed into the final product.

An additional object of the present invention is to provide an apparatus capable of reinforcing a plastic article with an elongated flexible reinforcing member which does not possess sufficient rigidity to maintain any given shape.

It is also an object of the persent invention to provide an apparatus capable of accomplishing the above objects and at the same time being made up of simple and ruggedly constructed parts which are very reliable in operation.

With the above objects in view, the present invention mainly consists of an apparatus for manufacturing reinforced elongated members, this apparatus including a nozzle having a pair of separate outer tubular wall portions spaced from each other to form a gap therebetween. An annular member is turnable about the axis of the nozzle, has an inner periphery extending across and covering the gap, and is formed with a bore communicating with the inner periphery of the annular member and with the gap. A spool carrier which is coaxial with the nozzle is supported for turning movement about the axis thereof, and the annular member and spool carrier are interconnected for rotation together. Thus, during rotation of the spool carrier and annular member a flexible reinforcing member may be unwound from a spool on the carrier and guided through the bore of the annular member into the nozzle to be formed into a helix within the nozzle by the action of the semi-solid plastic composition in the nozzle which draws the flexible member into the same and along the same.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
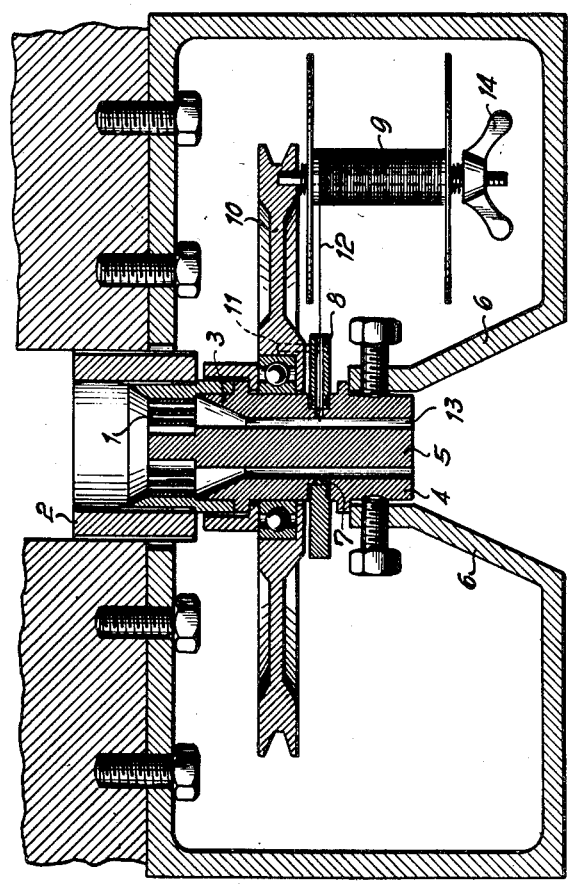
Fig. 1 is a fragmentary, sectional, elevational view showing one possible apparatus constructed in accordance with the present invention.

Referring now to the drawings, and to Fig. 1 in particular, it will be seen that a nozzle 1–5 is carried by the support means fragmentarily shown at the upper portion of Fig. 1. This nozzle forms the outlet of a screw press having a cylindrical member 2 at its outlet end, this cylindrical member 2 being covered by a plate 1 formed with a plurality of bores passing therethrough, as shown in Fig. 1. The plate 1 has fixed thereto and extending therefrom a core member 5 which extends along the axis of the nozzle, and the nozzle includes an outer tubular wall portion 3 and an outer tubular wall portion 4 which are separate from and coaxial with each other so as to form therebetween the annular gap 7. Thus, it will be seen that the core member 5 forms with the tubular wall portions 3 and 4 of the nozzle a tubular space 13 through which a plastic composition is extruded to be formed into a hose, for example. The tubular wall portion 3 of the nozzle is connected to the member 1 by a nut which threadedly engages the member 1 and has an inwardly extending annular projection engaging an outwardly extending annular flange of the member 3, as indicated in Fig. 1. A pair of arms 6 having the configuration indicated in Fig. 1 are fixed to the stationary support means of the apparatus by screw members, as shown in Fig. 1, and the free ends of the arms 6 carry screw members which engage the outer tubular wall portion 4 of the nozzle so as to support the wall portion 4 and so as to maintain the same in the position illustrated in Fig. 1.

An annular member 8 is turnably carried by nozzle for rotation about the axis thereof, and it will be seen from Fig. 1 that this annular member 8 has an inner periphery extending across and covering the gap 7. Adjacent the gap 7 the tubular portions 3 and 4 of the nozzle are each provided with annular shoulders which turnably support the member 8 which extends at its inner periphery into the annular groove formed by these shoulders. As may be seen from Fig. 1 the annular member 8 is formed with a bore passing through the same from its outer to its inner periphery radially toward the axis of the nozzle, and this bore is located at the elevation of the gap 7 so as to communicate therewith. A textile or metallic thread 12 may be unwound from a spool 9 and threaded through the radial bore of annular member 8 and through the gap 7 into the space 13 of the nozzle. The spool 9 is carried by a spool carrier 10 in the form of a pulley adapted to be driven by a V-belt, this carrier 10 being turnably supported through a suitable ball bearing or the like on the tubular portion 3 of the nozzle for rotation about the axis of the nozzle. Any suitable drive which includes a V-belt passing about the carrier 10 is provided to rotate the latter. The annular member 8 carries a pin 11 which extends into a bore of the carrier 10 so that this pin 11 forms a means for transmitting the turning movement of the carrier 10 to the annular member 8.

The above described apparatus operates as follows:

At the beginning of the operations, that is, before the plastic composition is extruded through the nozzle, the elongated flexible reinforcing member 12 is threaded through the apparatus in the above described manner. It is preferable to provide at the start of the operations a substantial length of the reinforcing member 12 within the space 13 of the nozzle. The extruding machine is then operated to force through the nozzle any suitable plastic such as, polyvinylchloride. Simultaneously with the movement of the plastic composition along the annular space 13 toward the outlet end of the nozzle, the carrier 10 is rotated so that the annular member 8 also rotates. Due to the frictional engagement between the reinforcing member 12 and the plastic composition, the rotation of the member 8 will cause the reinforcing member 12 to become wound about the material being extruded and to become embedded therein. The movement of the plastic composition downwardly through the space 13 draws the reinforcing member 12 along the nozzle so that the plastic material itself pulls the member 12 axially along the nozzle while the rotating member 8 winds the flexible member 12 about the axis of the nozzle, and as a result the reinforcing member 12 is automatically embedded in the plastic material and has a helical configuration therein. The deformation in the outer surface of the plastic composition produced by the reinforcing member 12 disappears as the plastic composition engages the inner surface of the tubular portion 4 and moves therealong, particularly because the plastic composition is under considerable pressure within the nozzle until the moment that the material reaches the bottom extremity of the nozzle, as viewed in Fig. 1. Thus, there are no blowholes or other free spaces in the material and the reinforcing member 12 is completely surrounded thereby. Reinforcing members of the most varied type may be used with the structure of the invention, and these reinforcing members may, for example, take the form of simple threads or threads made of different materials.

In the event that it is desired to reinforce a hose or the like in accordance with the present invention with a plurality of different threads, then, instead of a single gap 7, the outer wall of the nozzle is divided into more than two portions which are mutually spaced from each other to provide a plurality of gaps each of which is covered by a turnable member 8, as shown in Fig. 1 for the gap 7. Where two such gaps and turnable members 8 are provided, then any suitable means may be provided for rotating the members 8 in opposite directions so that the helixes along which two such reinforcing members extend are directed oppositely with respect to each other.

The extent to which the reinforcing member 12 approaches the core 5 may be regulated in any number of ways. For example, the turning of the spool 9 may be braked, and for this purpose the spool 9 is turnable on a pin which threadedly carries a wing nut 14 engaging a coil spring which presses against the bottom flange of the spool 9, as viewed in Fig. 1, the top flange of the spool 9 engaging another coil spring which abuts against the carrier 10, as shown in Fig. 1. Thus, by tightening or loosening the wing nut 14, it is possible to vary the resistance provided by the spool 9 against the force which draws the reinforcing member 12 from the spool 9, and in this way it is possible to regulate the depth at which the reinforcing member 12 is located in the finished product. Also, as will be pointed out with respect to the embodiment of Fig. 2 it is possible to provide the core 5 with an annular projection located opposite the gap 7 to limit the extent to which the member 12 approaches the axis of the nozzle. With an arrangement of this latter type, such an annular projection would be provided with axially extending grooves through which the plastic composition passes on its way to the outlet of the nozzle.

Figure 2:
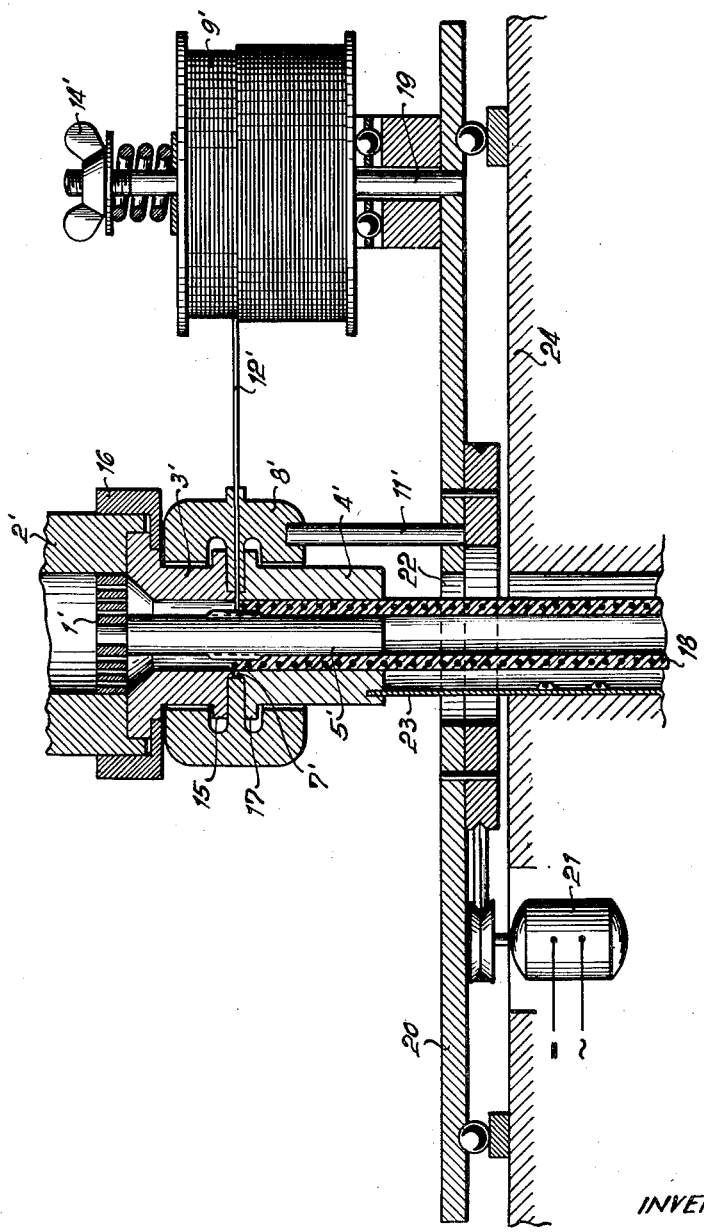
Fig. 2 is a sectional, elevational, fragmentary view showing another apparatus constructed in accordance with the present invention.

Referring now to Fig. 2 which shows another possible embodiment of the invention, it will be seen that the nozzle of Fig. 2 extends vertically as was the case with the nozzle of Fig. 1. Fig. 2 shows the cylindrical outlet 2' of the screw press, the plate 1' formed with the bores through which the plastic composition passes, the outer tubular wall portions 3' and 4' of the nozzle and the axial core 5' of the nozzle. Furthermore, Fig. 2 shows the nut 16 which fixes the tubular wall portion 3' of the nozzle to the member 2' in much the same way that the tubular wall portion 3 is fixed to the member 1 in Fig. 1. As is evident from Fig. 2 the tubular portions 3' and 4' of the nozzle are coaxial and spaced from each other to provide a gap 7' corresponding to the above described gap 7. However, in the case of Fig. 2 the tubular member 3' is provided adjacent gap 7' with an outer annular flange 15 while the tubular member 4' is provided adjacent the gap 7' with an outer annular flange 17. An annular member 8' is turnable about the axis of the nozzle of Fig. 2, and this annular member 8' is different from annular member 8 in that it includes at its opposite ends inwardly extending annular end peripheral portions respectively engaging the shoulders 15 and 17, as shown in Fig. 2, so that while the tubular portion 3' supports the annular member 8' for rotation, this annular member 8' limits the movement of the tubular portions 3' and 4' from each other and thus controls the size of the gap 7'. The end faces of flanges 15 and 17 which are directed toward each other form shoulders with the end faces of the tubular portions 3' and 4' which are directed toward each other and which define the gap 7'. These shoulders form an annular groove into which an intermediate inner peripheral portion of annular member 8' extends, so that in this way the annular member 8' also limits the movement of the tubular portions 3' and 4' toward each other and is at the same time turnably supported by these tubular portions of the nozzle. As was the case with Fig. 1, the annular member 8' is formed with a radial bore communicating with the inner periphery thereof which extends across and covers the gap 7' so that an elongated flexible reinforcing member 12' may be threaded through this bore and through the gap 7' into the nozzle. Instead of the arrangements shown in Figs. 1 and 2, it is also possible to provide roller bearings or bearings of any other type to promote the freedom with which the annular member 8 or 8' turns. The annular member 8 or 8', for ease in the manufacture and assembly of the parts, may be made of semi-circular halves which are joined together by screws or the like. Instead of directing the bore of the member 8 or 8' along a line which passes through the axis of the nozzle, it is preferable to direct this bore along a straight line which is tangential to the outer surface of the core 5 or 5'.

The embodiment of Fig. 2 includes a support means 24 which has portions not shown supporting the nozzle, and this support means 24 is provided with a ball or roller bearing diagrammatically shown in Fig. 2, for turnably supporting a spool carrier 20 for rotation about the axis of the nozzle. The support means 24 also carries a motor 21 which drives a pulley which in turn drives a belt passing about a pulley fixed to and coaxial with the carrier 21 at the bottom face thereof, as viewed in Fig. 2, so that in this way the carrier 20 is rotated about the axis of the nozzle. The carrier 20 has a pin 19 fixed thereto and extending upwardly therefrom through a sleeve which at its top face carries a bearing to support the spool 9' for rotation about the axis of pin 19 which extends through the spool 9', and a coil spring is located about the pin 19 between a pair of washers respectively bearing against the spool 9' and the wing nut 14', which is threadedly carried by the pin 19, so that by turning the wing nut 14' it is possible to regulate the resistance to turning movement of the spool 9' and in this way regulating the extent to which the reinforcing member 12' is embedded, as was described above.

A pin 11' is fixed to the spool carrier 20 and extends upwardly therefrom into a recess of the annular member 8' so that this pin 11' interconnects the carrier 20 and annular member 8' for rotation together about the axis of the nozzle. The carrier 20 is formed with an opening 22 through which the reinforced manufactured article 18 may pass, and the support 24 is formed with an aligned opening for the same purpose. Furthermore, the support 24 has an arm 23 fixed thereto and extending upwardly through the opening 22 into engagement with the tubular portion 4' of the nozzle, as by extending into a recess thereof, to prevent rotation of this tubular portion 4'.

It will be noted that the core 5' of Fig. 2 is provided with an annular projection formed with elongated grooves passing axially therethrough, as shown in dotted lines in Fig. 2, so that this projection limits the extent to which the reinforcing member 12' may be embedded in the plastic material, and this projection, which actually is a series of axially extending ribs of the core 5', may be provided with the core 5 as well as with the core 5'. Fig. 2 clearly indicates how the finished article 18 issues from the nozzle, and the operation of the structure of Fig. 2 is believed to be self-evident. While material is passing through the nozzle in a downward direction, as viewed in Fig. 2, the motor 21 rotates carrier 20 and of course annular member 8' therewith and the reinforcing member 12' is formed into a helix embedded within the article 18 simultaneously with the manufacture thereof in the manner described above. The embodiment of Fig. 2 is preferred under certain circumstances to that of Fig. 1 because the carrier 20 of Fig. 2 is capable of carrying much larger spools than the carrier 10 of Fig. 1, and therefore the length of reinforced hose or the like which may be continuously manufactured by the embodiment of Fig. 2 is far greater than the length which can be continuously manufactured with the embodiment of Fig. 1.

Figure 3:
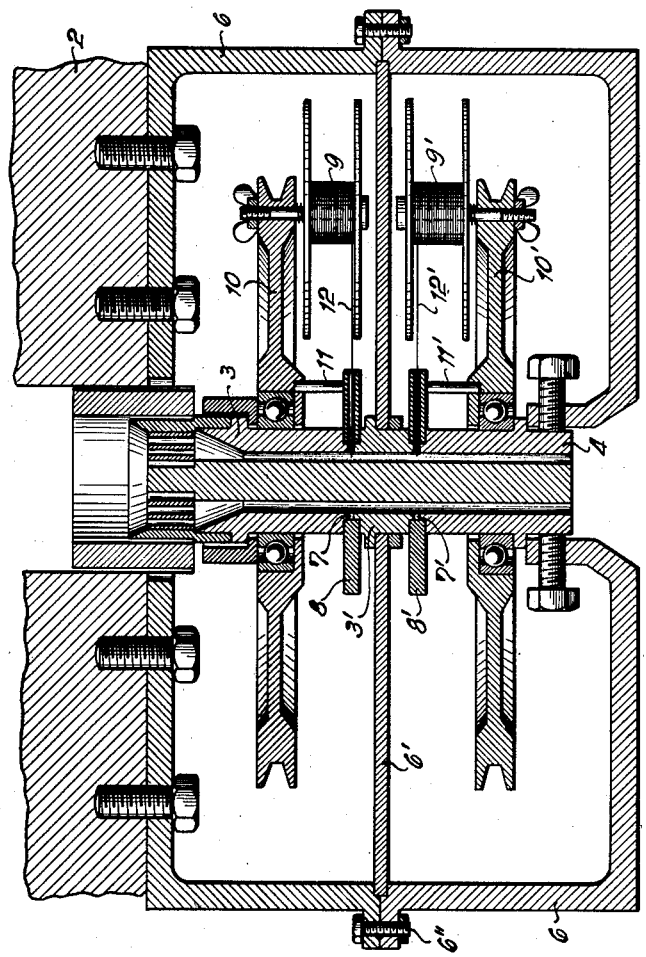
Fig. 3 is a sectional, elevational, fragmentary view showing still another apparatus according to the present invention for reinforcing a hose with two threads.

As indicated in column 3, lines 62–74, two or more threads may be used for the reinforcement of a hose. One possible embodiment of an apparatus for the reinforcement of a hose by means of two threads 12, 12' is shown in Fig. 3. In this apparatus the nozzle is provided with two annular gaps 7, 7' at a distance from each other, both of which are covered from outside by annular members 8, 8', as is shown for one gap 7 in Fig. 1. Each annular member 8, 8' is formed with a bore so that threads 12, 12' may be passed through. Since both annular members 8, 8' are turning in an opposite sense of rotation with respect to each other—with the same sense of coiling for the reinforcement a plurality of bores for the passage of the threads could be provided in one annular member—it is necessary to support both spools 9, 9', which release the threads 12, 12' each for one annular member 8, 8', independently from each other and to have them rotate together with each respectively cooperating annular member 8, 8'. Each spool 9, 9' is carried by a spool carrier 10, 10' which is turnably supported on the respective tubular portion 3, 4 of the nozzle and which is solidly connected with the respective annular member 8, 8', for instance by means of a pin 11, 11'. Reaching around the spools 9, 9' and the spool carriers 10, 10' are again arms 6, which are attached to a screw press, and which support directly the outer tubular wall portion 4 of the nozzle, and through a disc 6' or arms or the like the central tubular wall portion 3' of the nozzle between the annular members 8, 8'. In order to facilitate the assembly the arms 6 may be separated and held together by screws 6''.

What is claimed as new and desired to be secured by Letters Patent is:

1. In an apparatus for manufacturing elongated reinforced members, in combination, nozzle means for extruding a plastic composition passing therethrough into an elongated member, said nozzle means having a pair of separate outer coaxial tubular wall portions; support means supporting said tubular wall portions of said nozzle means in axially spaced relation to each other to form therebetween an annular gap communicating with the interior of said nozzle means; an annular member rotatably carried by said nozzle means, having an inner periphery extending across and closing said gap, and formed with a bore communicating with said inner periphery and with said gap, so that a flexible reinforcing member may pass through said bore into said nozzle.

2. In an apparatus for manufacturing elongated reinforced members, in combination, nozzle means for extruding a plastic composition passing therethrough into an elongated member, said nozzle means having a pair of separate outer coaxial tubular wall portions; support means supporting said tubular wall portions of said nozzle means in spaced relation to each other to form therebetween an annular gap communicating with the interior of said nozzle means; an annular member turnably carried by said nozzle means for rotation about the axis thereof, having an inner periphery extending across and closing said gap, and formed with a bore communicating with said inner periphery and with said gap, so that a flexible reinforcing member may pass through said bore into said nozzle; and turning means operatively connected to said annular member for turning the same about the nozzle axis so that the flexible reinforcing member takes the form of a helix embedded in the extruded member.

3. In an apparatus for manufacturing elongated reinforced members, in combination, nozzle means for extruding a plastic composition passing therethrough into an elongated member, said nozzle means having an outer tubular wall portion formed with a pair of annular gaps spaced along the axis of said nozzle means and each communicating with the interior and exterior of the nozzle means; a pair of annular members turnably carried by said nozzle means, respectively having inner peripheries extending across and covering said gaps, and respectively formed with bores communicating with said inner peripheries and gaps, respectively, so that a pair of flexible reinforcing members may respectively be guided through said bores and gaps into said nozzle means; and turning means operatively connected to said annular members for turning the same about the axis of said nozzle means in opposite directions, respectively.

4. In an apparatus for manufacturing elongated reinforced members, in combination, nozzle means for extruding a plastic composition passing therethrough into an elongated member, said nozzle means having a pair of separate outer coaxial tubular wall portions; support means supporting said tubular wall portions of said nozzle means in spaced relation to each other to form therebetween an annular gap communicating with the interior of said nozzle means; an annular member turnably carried by said nozzle means for rotation about the axis thereof, having an inner periphery extending across and closing said gap, and formed with a bore communicating with said inner periphery and with said gap, so that a flexible reinforcing member may pass through said bore into said nozzle; a carrier carried by one of said tubular wall portions for rotation about the axis of said nozzle means, said carrier having thereon means for supporting a spool from which the reinforcing member may be unwound for movement through said bore and gap into said nozzle; and means engaging said carrier and annular member for transmitting turning movement of said carrier to said annular member.

5. In an apparatus for manufacturing elongated reinforced members, in combination, support means; a nozzle carried by said support means for extruding a plastic composition into an elongated member, said nozzle having a first tubular wall portion adjacent and carried by said support means and a second tubular wall portion coaxial with said first tubular wall portion and spaced therefrom to form therewith an annular gap communicating with the interior of said nozzle; an annular member turnably carried by said nozzle, having an inner periphery extending across and covering said gap, and formed with a bore communicating with said inner periphery and gap; a carrier for carrying a spool from which an elongated flexible reinforcing member passes through said bore and gap into said nozzle, said carrier being turnably carried by said first tubular wall portion of said nozzle for rotation about the axis thereof; means engaging said carrier and annular member for transmitting turning movement of said carrier to said annular member; and arm means fixed to said support means, extending freely about said carrier and annular member, and engaging said second tubular wall portion to support the same.

6. In an apparatus for manufacturing elongated reinforced members, in combination, support means; a nozzle carried by said support means for extruding a plastic composition into an elongated member, said nozzle having a first tubular wall portion adjacent and carried by said support means and a second tubular wall portion coaxial with said first tubular wall portion and spaced therefrom to form therewith an annular gap communicating with the interior of said nozzle, each of said tubular wall portions having an outer annular shoulder adjacent said gap; an annular member turnable on said nozzle, extending across said shoulders, having at its ends, respectively, a pair of inner annular and peripheral portions engaging said shoulders, respectively, and having between said end peripheral portions an intermediate inner peripheral portion extending across and covering said gap, said annular member being formed with a bore communicating with said gap; and an annular carrier carried by said support means for turning movement about the axis of said nozzle and adapted to carry a spool from which a flexible reinforcing member extends through said bore and gap into the nozzle, said carrier being connected to said annular member for turning the same upon turning movement of said carrier.

7. In an apparatus for manufacturing elongated reinforced members, in combination, support means; a nozzle carried by said support means for extruding a plastic composition into an elongated member, said nozzle having a first tubular wall portion adjacent and carried by said support means and a second tubular wall portion coaxial with said first tubular wall portion and spaced therefrom to form therewith an annular gap communicating with the interior of said nozzle, each of said tubular wall portions having an outer annular shoulder adjacent said gap; an annular member turnable on said nozzle, extending across said shoulders, having at its ends, respectively, a pair of inner annular and peripheral portions engaging said shoulders, respectively, and having between said end peripheral portions an intermediate inner peripheral portion extending across and covering said gap, said annular member being formed with a bore communicating with said gap; and an annular carrier carried by said support means for turning movement about the axis of said nozzle and adapted to carry a spool from which a flexible reinforcing member extends through said bore and gap into the nozzle, said carrier being connected to said annular member for turning the same upon turning movement of said carrier, said annular carrier being formed with an opening through which the extruded article may pass from the nozzle.

8. In an apparatus for manufacturing elongated reinforced members, in combination, support means; a nozzle carried by said support means for extruding a plastic composition into an elongated member, said nozzle having a first tubular wall portion adjacent and carried by said support means and a second tubular wall portion carried by said support means in a position coaxial with said first tubular wall portion and spaced therefrom to form therewith an annular gap communicating with the interior of said nozzle; an annular member turnably carried by said nozzle, having an inner periphery extending across and covering said gap, and formed with a bore communicating with said inner periphery and gap; a carrier for carrying a spool from which an elongated flexible reinforcing member passes through said bore and gap into said nozzle, said carrier being turnably carried by said first tubular wall portion of said nozzle for rotation about the axis thereof; means engaging said carrier and annular member for transmitting turning movement of said carrier to said annular member; and means on said carrier for turnably supporting a spool.

9. In an apparatus for manufacturing elongated reinforced members, in combination, support means; a nozzle carried by said support means for extruding a plastic composition into an elongated member, said nozzle having a first tubular wall portion adjacent and carried by said support means and a second tubular wall portion coaxial with said first tubular wall portion and spaced therefrom to form therewith an annular gap communicating with the interior of said nozzle, each of said tubular wall portions having an outer annular shoulder adjacent said gap; an annular member turnable on said nozzle, extending across said shoulders, having at its ends, respectively, a pair of inner annular and peripheral portions engaging said shoulders, respectively, and having between said end peripheral portions an intermediate inner peripheral portion extending across and covering said gap, said annular member being formed with a bore communicating with said gap; an annular carrier carried by said support means for turning movement about the axis of said nozzle and adapted to carry a spool from which a flexible reinforcing member extends through said bore and gap into the nozzle, said carrier being connected to said annular member for turning the same upon turning movement of said carrier, said annular carrier being formed with an opening through which the extruded article may pass from the nozzle; and an arm carried by said support means, extending through said opening of said carrier, and engaging said second tubular wall portion to prevent rotation of the latter.

10. In an apparatus for manufacturing elongated reinforced members, in combination, a nozzle having a pair of separate outer tubular wall portions axially spaced from each other to form a gap therebetween; an annular member turnable about the axis of said nozzle, having an inner periphery extending across and covering said gap, and formed with a bore communicating with said periphery and gap; a spool carrier coaxial with said nozzle; means supporting said carrier for turning movement about the axis of said nozzle; and means interconnecting said annular member and carrier for rotation together.

11. In an apparatus for manufacturing elongated reinforced members, in combination, a nozzle having a pair of separate outer tubular wall portions spaced from each other to form a gap therebetween and having an axial core member spaced from said tubular wall portions to define a tubular space therewith so that a tubular member may be extruded by the nozzle from a plastic composition; an annular member turnable about the axis of said nozzle, having an inner periphery extending across and covering said gap, and formed with a bore communicating with said periphery and gap; a spool carrier coaxial with said nozzle; means supporting said carrier for turning movement about the axis of said nozzle; and means interconnecting said annular member and carrier for rotation together.

12. In an apparatus for manufacturing elongated reinforced members, in combination, a nozzle having a pair of separate outer tubular wall portions spaced from each other to form a gap therebetween and having an axial core member spaced from said tubular wall portions to define a tubular space therewith so that a tubular member may be extruded by the nozzle from a plastic composition, said core member having an outer annular projection located opposite said gap; an annular member turnable about the axis of said nozzle, having an inner periphery extending across and covering said gap, and formed with a bore communicating with said periphery and gap; a spool carrier coaxial with said nozzle; means supporting said carrier for turning movement about the axis of said nozzle; and means interconnecting said annular member and carrier for rotation together.

References Cited in the file of this patent

UNITED STATES PATENTS

| | | |
|---|---|---|
| 802,159 | Dykes | Oct. 17, 1905 |
| 815,571 | Williams | Mar. 20, 1906 |
| 1,017,232 | Rohm | Feb. 13, 1912 |
| 1,111,418 | Wadsworth | Sept. 22, 1914 |
| 1,322,464 | Oden | Nov. 18, 1919 |
| 2,343,747 | Chevnack | Mar. 7, 1944 |
| 2,366,087 | Chevnack | Dec. 26, 1944 |

FOREIGN PATENTS

| | | |
|---|---|---|
| 810,638 | France | Dec. 28, 1936 |